United States Patent
Furuta

(10) Patent No.: US 7,065,289 B2
(45) Date of Patent: Jun. 20, 2006

(54) APPARATUS AND METHOD FOR CONTROLLING IMAGE QUALITY REDUCTION OF IMAGE INFORMATION

(75) Inventor: Yuji Furuta, Tokyo (JP)

(73) Assignee: NEC Corporation, Tokyo (JP)

( * ) Notice: Subject to any disclaimer, the term of this patent is extended or adjusted under 35 U.S.C. 154(b) by 976 days.

(21) Appl. No.: 09/735,039

(22) Filed: Dec. 12, 2000

(65) Prior Publication Data

US 2001/0007597 A1    Jul. 12, 2001

(30) Foreign Application Priority Data

Dec. 13, 1999  (JP)  ................................. 11-353503

(51) Int. Cl.
*H04N 5/91* (2006.01)

(52) U.S. Cl. .......................... 386/94; 386/46; 380/203

(58) Field of Classification Search .................. 386/46, 386/94; 380/200–203, 3; 382/100
See application file for complete search history.

(56) References Cited

U.S. PATENT DOCUMENTS 5,535,275 A *  7/1996  Sugisaki et al. ............ 380/203
5,583,941 A *  12/1996  Yoshida et al. ............. 380/243
5,991,403 A *  11/1999  Aucsmith et al. ............. 380/37
6,310,962 B1 * 10/2001  Chung et al. ................ 382/100
6,542,618 B1 *  4/2003  Rhoads ........................ 386/94

FOREIGN PATENT DOCUMENTS

JP        6-311043      11/1994
JP        7-30855        1/1995

\* cited by examiner

*Primary Examiner*—James J. Groody
*Assistant Examiner*—Christopher Onuaku
(74) *Attorney, Agent, or Firm*—Scully, Scott, Murphy & Presser, P.C.

(57) ABSTRACT

An apparatus 10 for controlling image quality reduction of image information, which is related to the present invention, has a VLD 30 for introducing a code stream input 21 thereinto of image information based on an MPEG, a reverse circuit 40 for introducing a pre-reverse level 32 thereinto from the VLD 30, and a VLC 50 for introducing a RUN 31 from the VLD 30 and an after-reverse level 42 from the reverse circuit 40, and a code stream output 51 of image information based on the MPEG is generated by the VLC 50 and is sent therefrom, and this code stream output 51 is provided for a digital copy.

12 Claims, 3 Drawing Sheets

APPARATUS AND METHOD FOR CONTROLLING IMAGE QUALITY REDUCTION OF IMAGE INFORMATION

BACKGROUND OF THE INVENTION

The present invention relates to a technology for conducting a digital copy of image information by means of a digital information compression technology, and more particularly to an apparatus for and a method of controlling image quality reduction of image information for making a copy after image quality of image information is reduced.

In general, there is an MPEG (Moving Picture Image Expert Group) method in a technology for compressing digital information of a moving picture image. When image information to which compression is applied by this MPEG is restored, and a digital copy is made, theoretically it is possible to infinitely and repeatedly make a copy without deteriorating its image quality.

Accordingly, it becomes to be substantially difficult to protect copyrights of all image information that can be an object to be copied.

Therefore, conventionally, a method of electronic transparency and so forth was proposed, in which specific copyright protection information for protecting a copyright was previously generated, and this protection information was stenciled into image information.

According to this method, a function for detecting a data, copy of which is prohibited by the above-described copyright protection information, is provided in a digital copy machine. And, the machine can be constructed so that, when such a data is detected in making a copy, to make a copy is automatically interrupted and a data is deleted if the data is already copied.

Also, an MPEG specification is provided in detail in ISO-13818 and JT-H262. Accordingly, in making a digital copy, a function for processing image information is required, which in principle conforms to these specification provisions.

However, when a digital copy of image information based on the MPEG specification is made by using such a conventional example, it is necessary to previously solve technical tasks as mentioned below.

First, it is necessary that to make a copy under execution is interrupted and a data is deleted if to make a copy of the data is already completed. For that, it becomes to be necessary to control the switching of selection and function of the interruption and deletion, and extremely complicated processing, including an original function of the digital copy, should be executed.

Second, also with regard to a data in a copy prohibition part, if it is not changed within a range that conforms to the MPEG specification, it becomes to be difficult to conduct image processing like a data in other parts. Accordingly, it is impossible to be compatible with reproduction of proper image information by a standard MPEG decoder. Therefore, to solve these technical items as a whole is an important technical task.

SUMMARY OF THE INVENTION

The objective of the present invention is to solve the above-mentioned tasks.

Moreover, the objective of the present invention is to provide an apparatus for and a method of controlling image quality reduction of image information, in which it is possible to easily make a copy of image information by means of a digital information compression technology by using a simple arrangement even though image quality is reduced.

The objective of the present invention is achieved by an apparatus for controlling image quality reduction of image information for reducing image quality of image information and conducting a digital copy by means of a digital information compression technology, comprising a reverse section for reversing a specific code by means of a code stream of the image information, and outputting it after reducing image quality of the image information by means of reverse of one code or a plurality of codes.

Also, the objective of the present invention is achieved by a method of controlling image quality reduction of image information for reducing image quality of image information and conducting a digital copy by means of a digital information compression technology, comprising steps of reversing a specific code by means of a code stream of the image information, and outputting it after reducing image quality of the image information by means of reverse of one code or a plurality of codes.

According to these apparatus for and method of controlling image quality reduction of image information, by means of the reverse of a specific code, the image quality of the image information is reduced and a whole code stream is combined together.

In the apparatus for controlling image quality reduction of image information of the present invention, the reverse section reverses a code on a coefficient table of discrete cosine transform. Also, in the method of controlling image quality reduction of image information of the present invention, the reverse step includes a step of reversing a code on a coefficient table of discrete cosine transform.

According to these apparatus and method, practical reverse section and step by means of orthogonal coordinate transform can be obtained.

In the apparatus for controlling image quality reduction of image information of the present invention, the reverse section reverses a code within a range in which a code stream can be combined by means of a digital information compression technology without changing data length of the code stream. Also, in the method of controlling image quality reduction of image information of the present invention, the reverse step includes a step of reversing a code within a range in which a code stream can be combined by means of a digital information compression technology without changing data length of the code stream.

According to these apparatus and method, the reverse section and step suitable for an information compression specification of image information can be obtained.

In the apparatus for controlling image quality reduction of image information of the present invention, the reverse section changes a deterioration degree of image quality by specifying a reverse position of a code. Also, in the method of controlling image quality reduction of image information of the present invention, the reverse step includes a step of changing a deterioration degree of image quality by specifying a reverse position of a code.

According to these apparatus and method, a deterioration degree of the image quality can be controlled by the reverse position.

In the apparatus for controlling image quality reduction of image information of the present invention, the reverse section specifies a reverse position by means of coordinates within each unit block of image information. Also, in the method of controlling image quality reduction of image information of the present invention, the reverse step includes a step of specifying a reverse position by means of coordinates within each unit block of image information.

According to these apparatus and method, the reverse position is specified by the coordinates of the unit block.

In the apparatus for controlling image quality reduction of image information of the present invention, the reverse section conducts image quality reduction of image information by dividing it into two steps or more than or equal to three steps. Also, in the method of controlling image quality reduction of image information of the present invention, the reverse step includes a step of conducting image quality reduction of image information by dividing it into two steps or more than or equal to three steps.

According to these apparatus and method, the reduction of the image quality is weakened or strengthen step by step.

In the apparatus for controlling image quality reduction of image information of the present invention, the reverse section conducts image quality reduction for at least one of a Y component, a Cr component and a Cb component of image information. Also, in the method of controlling image quality reduction of image information of the present invention, the reverse step includes a step of conducting image quality reduction for at least one of a Y component, a Cr component and a Cb component of image information.

According to these apparatus and method, the reduction of the image quality is conducted for a specified component of the image information.

In the apparatus for controlling image quality reduction of image information of the present invention, the reverse section has a random number generator for generating a random number for designating existence of code reverse. Also, in the method of controlling image quality reduction of image information of the present invention, the reverse step includes of a step of generating a random number for designating existence of code reverse.

According to these apparatus and method, the image quality reduction of the image information is conducted at random based on the random number.

In accordance with the apparatus for and the method of controlling image quality reduction of image information, since the image quality of the image information is reduced by means of the reverse of a specific code, the data length of each code does not change. Also, since a whole code stream is combined together as conventionally, a change of information content does not occur before and after a digital copy in association with the code reverse. Therefore, it is possible to provide the apparatus for and the method of controlling image quality reduction of image information, in which it is possible to easily make a copy of image information, capable of easily making a digital copy, by using a simple arrangement even though image quality is reduced.

BRIEF DESCRIPTION OF THE DRAWINGS

This and other objects, features and advantages of the present invention will become more apparent upon a reading of the following detailed description and drawings, in which.

DESCRIPTION OF THE EMBODIMENTS

Figure 1:
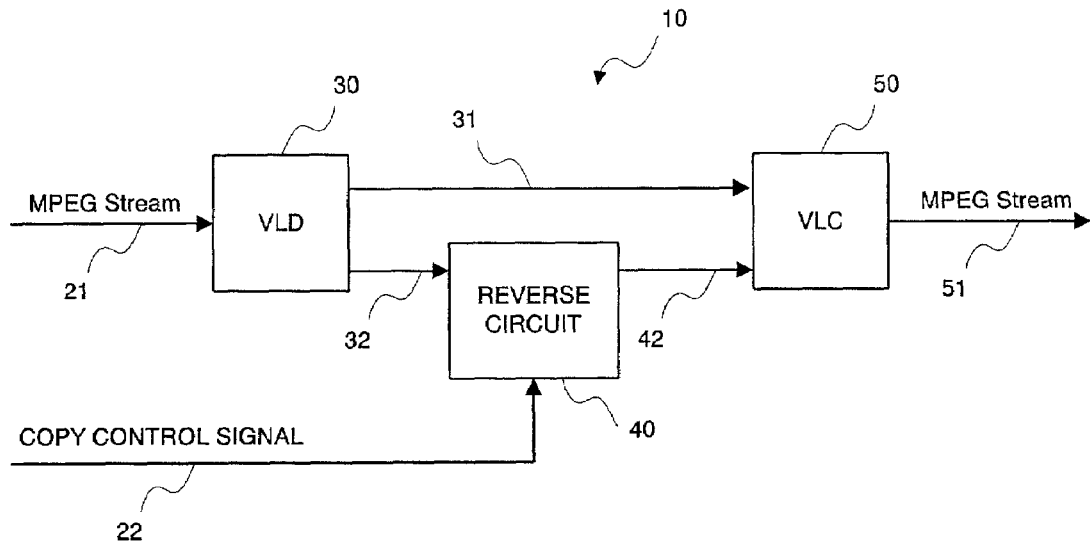
FIG. 1 is a view explaining one example of an apparatus for controlling image quality reduction of image information, which is related to a first embodiment of the present invention.

Below, embodiments in relation to the present invention will be explained by referring to the drawings.

FIG. 1 is a block diagram showing one example of an arrangement of an apparatus for controlling image quality reduction of image information, which is related to a first embodiment of the present invention.

In this first embodiment, in case that an MPEG is applied to a digital information compression technology for a moving picture image, an apparatus 10 for controlling image quality reduction of image information, which is suitable for this application, is shown. This apparatus 10 for controlling image quality reduction has a VLD 30 for introducing a code stream input 21 thereinto of image information based on the MPEG, and a reverse circuit 40 for introducing a pre-reverse level 32 thereinto from the VLD 30.

Further, the apparatus 10 for controlling image quality reduction has a variable length coding circuit (referred to as a VLC, hereinafter) 50 for introducing a RUN (Run Length) 31 from the VLD 30 and an after-reverse level 42 from the reverse circuit 40, and a code stream output 51 of image information based on the MPEG is generated by the VLC 50 and is sent from the VLC 50, and this code stream output 51 is provided for a digital copy. Also, a reverse section in accordance with the present invention is constructed of the reverse circuit 40.

Next, an operation of the first embodiment will be mentioned.

The VLD 30 conforms to ISO13818, and introduces the code stream input 21 thereinto of image information based on the MPEG via a transmission section (not shown) and decodes it. Thereby, in each unit block of the image information, the RUN 31 and the pre-reverse level (LEVEL) 32 are generated for an AC coefficient of a Y component in respective code information. This Y component represents a luminance component of the image information.

Also, out of the code stream input 21 based on the MPEG, which was introduced into the VLD 30, the code stream in which the AC coefficient of the Y component in each unit block is excluded is transmitted to the VLC 50 by means of a section (not shown). In other words, the code stream other than a part corresponding to the AC coefficient of the Y component in each unit block is output without any change.

The reverse circuit 40 introduces the pre-reverse level 32 thereinto, and however, sends the introduced pre-reverse level 32 to the VLC 50 as it is as the after-reverse level 42 when instruction for reducing image quality of image information is not provided by a copy control signal 22.

Also, when the instruction for reducing the image quality of the image information is provided by the copy control signal 22, the reverse circuit 40 reverses the positive and negative of a code of the pre-reverse level 32, and sends it to the VLC 50 as the after-reverse level 42.

The VLC 50 generates the code stream output 51 by means of the MPEG in conformity with the ISO13818 based on the above-mentioned code stream in which the AC coefficient of the Y component in each unit block is excluded, the after-reverse level 42 and the RUN 31.

According to this, even though the image quality of the image information is reduced by means of the reverse of the positive and negative of the code, between the code stream input 21 that is an information source and the code stream output 51 that is an object to be copied, information contents of both of them are not changed. In other words, when a digital copy is made by means of the code stream output 51, a whole data length is not changed.

Also, the code stream output 51 becomes to conform to the MPEG specification same as the above-mentioned code stream in which the AC coefficient is excluded. Accordingly, even though the image quality of the image information is reduced, it is possible to reproduce both of the code streams by means of an MPEG decoder.

Figure 2:
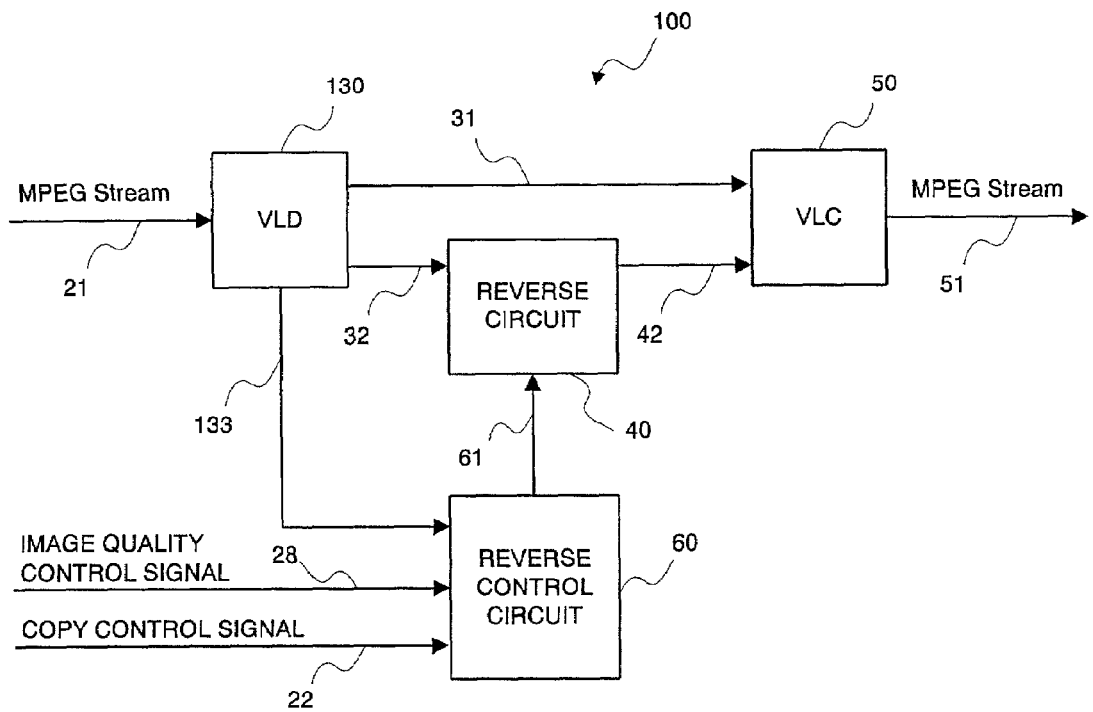
FIG. 2 is a block diagram explaining one example of a second embodiment in accordance with the present invention.

FIG. 2 is a block diagram explaining one example of a second embodiment in accordance with the present invention.

An apparatus 110 for controlling image quality reduction of image information in accordance with the second embodiment generates a RUN 31 and a pre-reverse level 32 in a VLD 130 for an AC coefficient of a Y component of each code information, and also, generates position information 133 which shows that the pre-reverse level 32 is placed at which positions in each unit block.

This position information 133 is information with respect to coordinates in each unit block, and is sent to a reverse control circuit 60 as mentioned below from the VLD 130.

When instruction for reducing image quality of image information is not provided by a copy control signal 22, the reverse control circuit 60 notifies the reverse circuit 40 thereof by means of a reverse control signal 61. As a result, the reverse circuit 40 sends the pre-reverse level 32 to the VLC 50 as it is as the after-reverse level 42.

Also, when the instruction for reducing the image quality of the image information is provided by the copy control signal 22, the reverse control circuit 60 introduces an image quality control signal 23 thereinto, and determines a reduction degree of image quality based on the instruction of the image quality control signal 23.

Figure 3:
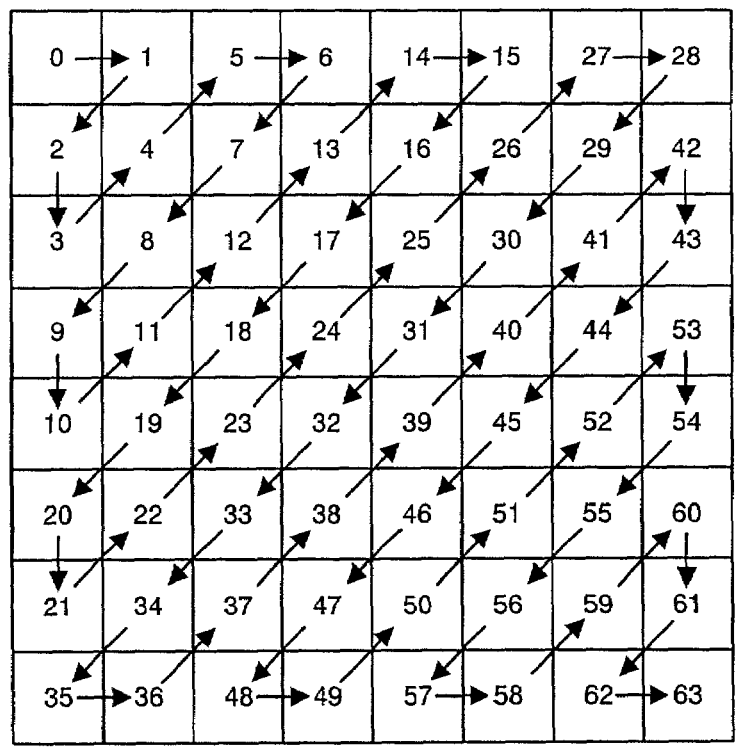
FIG. 3 is a view explaining one example of a unit block of a zig zag scan by means of a VLD shown in FIG. 2.

FIG. 3 is a view explaining one example of a unit block of a zig zag scan by means of a VLD shown in FIG. 2. In this one example, arrows show an order of an input of data to a coefficient table by means of the zig zag scan.

Figure 4:
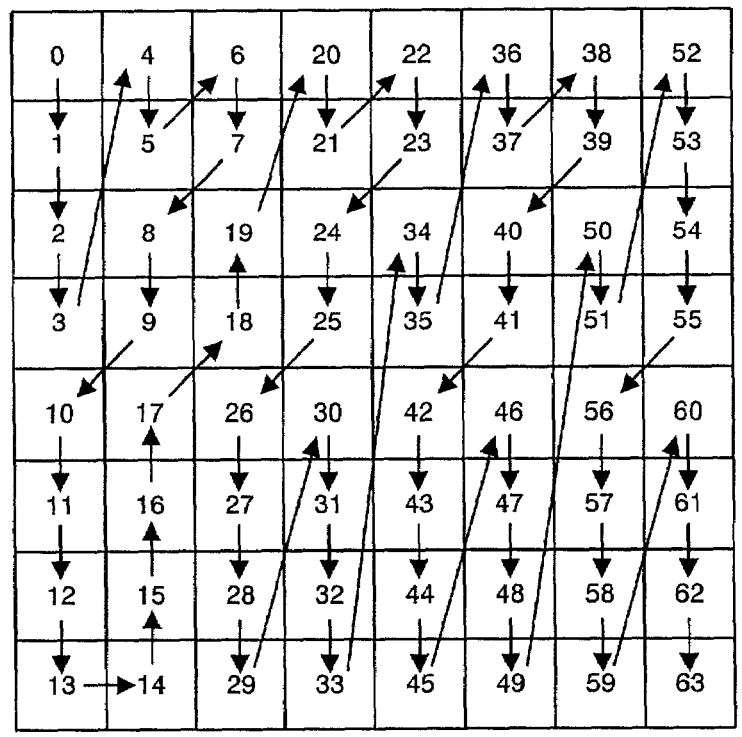
FIG. 4 is a view explaining one example of a unit block of an alternate scan by means of the VLD shown in FIG. 2.

FIG. 4 is a view explaining one example of a unit block of an alternate scan by means of the VLD shown in FIG. 2. In this one example, arrows show an order of an input of data to a coefficient table by means of the alternate scan.

These unit blocks are provided by ISO13818, and constitute 64 code information in a discrete cosine transform (DCT) table that is divided into 8 pixels by 8 pixels.

Also, with regard to the existence of an AC component, since from a characteristic of the MPEG there are more AC components in codes on a right-hand lower side and less on a left-hand upper side, the reduction of image quality can be controlled by utilizing this characteristic. This can be established regardless of the zig zag scan or the alternate scan even though the unit blocks in accordance with these two examples are compared with each other. In addition, the AC component is indicated by the above-mentioned AC component.

For example, in case that (RUN, LEVEL) is represented by a series 1 below, it means that there is no AC component for "continuous numbers" by means of the RUN, although longitudinal and lateral positions are different from each other, which depends on a zig zag scan or an alternate scan.

(RUN, LEVEL)= . . . (6, 5), (3, −1) . . .  Series 1

In this series 1, "−1" is stored in the fourth coordinates which gain by three coordinates from coordinates in which "5" AC coefficients become to be "0", the AC component does not exist.

Also, it can be understood that, when a value of the RUN is small, the number of the codes becomes to be large. In general, this can be understood because, in information compression by means of the MPEG, since a numerical value on a left-hand upper side is smaller and a numerical value on a right-hand lower side is larger in an Intra (Non-Intra) quantization table, "0" occurs easily for a value after division.

Figure 5:
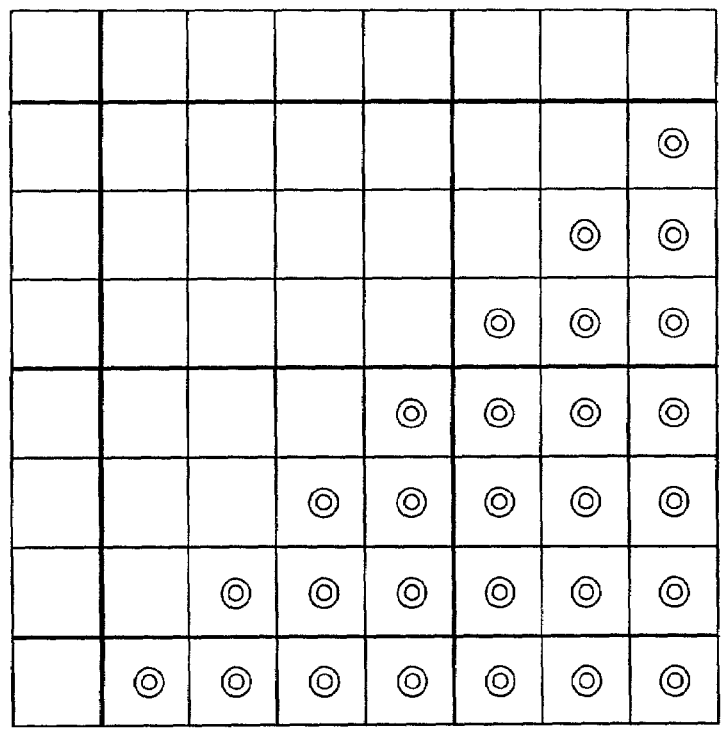
FIG. 5 is a view explaining reverse positions of codes when image quality is weakly reduced.

FIG. 5 is a view explaining reverse positions of codes when image quality is weakly reduced.

When the image quality control signal 23 is introduced into the reverse control circuit 60, the reduction of image quality is instructed step by step. For example, in order to provide instruction of two-step reduction, in case of weakly reducing the image quality, only when a position coincides with positions shown by a symbol ◯ in FIG. 5, the position is notified to the reverse circuit 40 by means of the reverse control signal 61. The reverse circuit 40 reverses a code of the pre-reverse level 32, and sends it to the VLC 50 as the after-reverse level 42.

Figure 6:
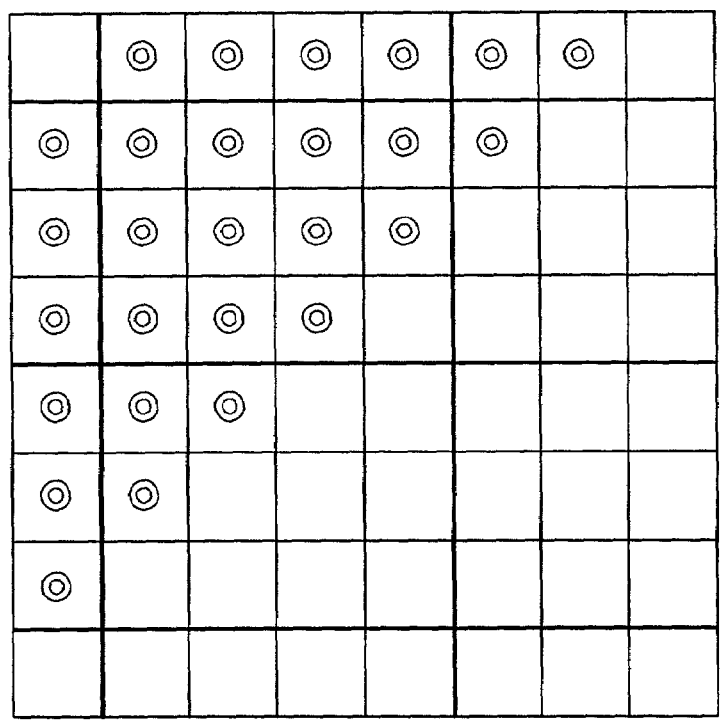
FIG. 6 is a view explaining reverse positions of codes when image quality is strongly reduced.

FIG. 6 is a view explaining reverse positions of codes when image quality is strongly reduced.

Contrary to the above, in case of strongly reducing the image quality, only when a position coincides with positions shown by a symbol ◯ in FIG. 6, the position is notified to the reverse circuit 40 by means of the reverse control signal 61. The reverse circuit 40 reverses a code of the pre-reverse level 32, and sends it to the VLC 50 as the after-reverse level 42.

In case of strongly reducing the image quality in this manner, there is no symbol ◯ at a corner on a left-hand upper side, and a code is not reversed at this position. This is because, since this part is a DC component in a unit block and is not an AC component, it is out of an object of image quality control for an AC component.

As mentioned above, since generally a ratio of code contents in which a Y component occupies image information is large, the image quality reduction in which the Y component of the image information is focused was mentioned as one example.

Next, a case will be explained as a third embodiment in accordance with the present invention, in which image quality reduction is conducted for a Cr component and a Cb component of image information. Here, the Cr component and the Cb component represent a color difference component of the image information, and by focusing on these components with respect to colors of an object image, and by effectively utilizing a characteristic of an apparatus for controlling image quality reduction of the present invention, it is possible to control a deterioration degree of the image quality from an different aspect.

Generally, since the above-mentioned Y component is related to luminance of image information, in visual observation by means of the naked eye, deterioration of image quality is not conspicuous so much even though the image quality is deteriorated, and it is difficult to understand a deterioration degree of the image quality. However, if such Cr component and Cb component are applied, since a component with respect to colors, which appeals to so called sensitivity of a human being, is changed, it is possible to make eyes of a human being feel as if the image quality is "deteriorated so much".

Accordingly, it is possible to control the deterioration of image quality by deteriorating the Y component of image information in accordance with the first and second embodiments or by deteriorating the Cr component or deteriorating the Cb component, or by arbitrarily combining these with each other. Thereby, it is possible to finely control the image quality deterioration to a further detailed step.

For example, in case that a Chroma-Format with respect to a color is 4:2:0, six codes consisting of Y, Y, Y, Y, Cb and Cr are included in a macro block including these Y component, Cr component and Cb component. Similarly, in case of 4:4:4, codes consisting of Y, Y, Y, Y, Cb, Cr, Cb, Cr, Cb, Cr, Cb and Cr are included.

Also, generally, these Y, Cb and Cr are a variable length code stream consisting of DC, AC, AC, . . . , AC, EOB. Here, DC represents a code of a DC component of a DC coefficient, and similarly, AC represents a code of an AC component, and also, EOB represents a code of End of Block. Such a data structure in the macro block is shown in a JT-H262 standard in detail.

Furthermore, as a fourth embodiment in accordance with the present invention, a random number generator for generating a random number can be provided in the reverse control circuit 60. For example, in case that all corresponding codes are only reversed, it can be considered that a data of the code stream output 51 after image quality is deteriorated is comparatively easily inverted into a data corresponding to the code stream input 21 before the image quality is deteriorated.

In this case, an arrangement is adopted, in which, at the above-mentioned position shown by a symbol ◯, when its code is input to the reverse circuit 40, whether or not reverse of the code is conducted is controlled by the random number generator. And, a logic value of "1" or "0" of 1 bit is sent from the random number generator, and when this logic value is "1", the position is notified to the reverse circuit 40 by means of the reverse control signal 61.

Also, when the logic value is "0", even though the position coincides with a corresponding position, the corresponding position is not notified, and reverse of a code at the corresponding position is not conducted by the reverse circuit 40. At this time, for 1 bit sent from the random number generator, for example, a least significant bit of a random number sequence constructed of a plurality of bit arrangements by means of an M series can be used.

In addition, in these embodiments, although one example in which image quality reduction is controlled by the two steps was explained, it is possible to finely control the image quality reduction step by step by dividing the steps into more steps.

The entire disclosure of Japanese Patent Application No. 11-353503 filed on Dec. 13, 1999 including specification, claims, drawing and summary are incorporated herein by reference in its entirety.

What is claimed is:

1. An apparatus for controlling image quality reduction of image information for reducing image quality of image information and conducting a digital copy by means of a digital information compression technology, comprising:
a reverse section for reversing a specific code by means of a code stream of said image information, and outputting it after reducing image quality of said image information by means of reverse of one code or a plurality of codes, wherein said reverse section specifies a reverse position by means of coordinates within each unit block of image information and wherein said reverse section has a random number generator for generating a random number for designating said coordinates.

2. An apparatus for controlling image quality reduction of image information according to claim 1, wherein said reverse section reverses a code on a coefficient table of discrete cosine transform.

3. An apparatus for controlling image quality reduction of image information according to claim 1, wherein said reverse section reverses a code within a range in which a code stream can be combined by means of a digital information compression technology without changing data length of said code stream.

4. An apparatus for controlling image quality reduction of image information according to claim 1, wherein said reverse section changes a deterioration degree of image quality by specifying a reverse position of a code.

5. An apparatus for controlling image quality reduction of image information according to claim 1, wherein said reverse section conducts image quality reduction of image information by dividing it into two steps or more than or equal to three steps.

6. An apparatus for controlling image quality reduction of image information according to claim 1, wherein said reverse section conducts image quality reduction for at least one of a Y component, a Cr component and a Cb component of image information.

7. A method of controlling image quality reduction of image information for reducing image quality of image information and conducting a digital copy by means of a digital information compression technology, comprising steps of:
reversing a specific code by means of a code stream of said image information, and outputting it after reducing image quality of said image information by means of reverse of one code or a plurality of codes, wherein said reverse step includes a step of specifying a reverse position by means of coordinates within each unit block of image information, said coordinates being designated by generating at least one random number.

8. A method of controlling image quality reduction of image information according to claim 7, wherein said reverse step includes a step of reversing a code on a coefficient table of discrete cosine transform.

9. A method of controlling image quality reduction of image, information according to claim 7, wherein said reverse step includes a step of reversing a code within a range in which a code stream can be combined by means of a digital information s compression technology without changing data length of said code stream.

10. A method of controlling image quality reduction of image information according to claim 7, wherein said reverse step includes a step of changing a deterioration degree of image quality by specifying a reverse position of a code.

11. A method of controlling image quality reduction of image information according to claim 7, wherein said reverse step includes a step of conducting image quality reduction of image information by dividing it into two steps or more than or equal to three steps.

12. A method of controlling image quality reduction of image information according to claim 7, wherein said reverse step includes a step of conducting image quality reduction for at least one of a Y component, a Cr component and a Cb component of image information.

* * * * *